| (12) | United States Patent | (10) Patent No.: | US 6,396,435 B1 |
|---|---|---|---|
| | Fleischhauer et al. | (45) Date of Patent: | *May 28, 2002 |

(54) METHOD FOR DETERMINING THE VERTICAL DISTANCE BETWEEN AN OBJECT AND A DEVICE WITH A VARIABLE POSITION

(75) Inventors: Norbert Fleischhauer, Eschborn; Gregor Hassler, Bad Camberg, both of (DE)

(73) Assignee: Mannesmann VDO AG, Frankfurt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,004

(22) PCT Filed: Mar. 18, 1998

(86) PCT No.: PCT/EP98/01548

§ 371 (c)(1),
(2), (4) Date: Sep. 13, 1999

(87) PCT Pub. No.: WO98/43111

PCT Pub. Date: Oct. 1, 1998

(30) Foreign Application Priority Data

Mar. 20, 1997 (DE) .......................................... 197 11 467

(51) Int. Cl.[7] ............................................... G01S 13/93
(52) U.S. Cl. .............................. 342/70; 342/71; 342/72; 342/126; 342/127; 342/128; 342/135
(58) Field of Search ............................. 342/70, 71, 72, 342/118, 126, 127, 128, 134, 135

(56) References Cited

U.S. PATENT DOCUMENTS

| 4,103,278 A | 7/1978 | Satake et al. ............... 367/107 |
| 5,999,092 A | * 12/1999 | Smith et al. ................. 340/436 |
| 6,011,508 A | * 1/2000 | Perreault et al. ............. 342/350 |
| 6,069,581 A | * 5/2000 | Bell et al. ..................... 342/70 |

FOREIGN PATENT DOCUMENTS

| DE | 3341022 | 5/1985 |
| DE | 3420004 | 12/1985 |
| DE | 4023538 | 1/1992 |
| WO | 9201954 | 2/1992 |

* cited by examiner

Primary Examiner—John B. Sotomayor
(74) Attorney, Agent, or Firm—Martin A. Farber (57) ABSTRACT

The invention relates to a method for determining the perpendicular distance between an object and a device whose position varies, in particular a motor vehicle, in the case of which device a first sensor which is arranged on this device emits a signal which is reflected by the object, and this reflected signal is received by this first sensor, in which case the delay time of the signal from transmission to reception is used by the first sensor to determine the distance between the first sensor and the object.

In order to determine the perpendicular distance to the object, this distance is used to determine all the possible positions of the object with respect to the first sensor, the signal reflected by the object is furthermore received by a second sensor, which is likewise arranged on the device whose position varies, and the delay time of the signal from the first sensor to the second sensor is used to determine a path from the first sensor to the object and from this object to the second sensor, from which path all the possible positions of the object with respect to the second sensor are determined, the positions determined by the first sensor and the second sensor with the same distance are then compared with one another, and the perpendicular distance to the device whose position varies is determined for those positions of the object which are detected by both the first sensor and the second sensor.

12 Claims, 7 Drawing Sheets

METHOD FOR DETERMINING THE VERTICAL DISTANCE BETWEEN AN OBJECT AND A DEVICE WITH A VARIABLE POSITION

FIELD AND BACKGROUND OF THE INVENTION

A method for determining the perpendicular distance between an object and a device whose position varies, in particular a motor vehicle, in the case of which method a first sensor which is arranged on this device emits a signal which is reflected by the object, and this reflected signal is received by this first sensor, in which case the delay time of the signal from transmission to reception is used by the first sensor to determine the distance between the first sensor and the object.

In order to make reversing easier, and to prevent collisions with parking vehicles or other objects which are in the way, it is known for sensors to be provided at the rear end of the motor vehicle, which sensors transmit, for example, ultrasound or radar signals and in turn receive the radiation reflected by the obstruction. In this case, the distance between the sensor that is arranged on the motor vehicle and the obstruction is determined from the delay time of the signal from the sensor to the obstruction and back again.

This method has the disadvantage that only one statement can be made about the distance, as such, between the sensor and object. It is not possible, however, to define the perpendicular distance between the obstruction and the motor vehicle (on the basis of the sensor that is arranged on the motor vehicle) owing to the ambiguity resulting from the possible positions of the obstruction that can occur for the same sensor-obstruction distance.

SUMMARY OF THE INVENTION

The invention is thus based on the object of specifying a method for determining the perpendicular distance to the object from a motor vehicle.

According to the invention, the object is achieved in that this distance is used to determine all possible positions of the object with respect to the first sensor, the signal reflected by the object is furthermore received by a second sensor, which is likewise arranged on the device whose position varies, and the delay time of the signal from the first sensor to the second sensor is used to determine a path from the first sensor to the object and from this object to the second sensor, from which path all the possible positions of the object with respect to the second sensor are determined, the possible positions of the first sensor and of the second sensor are then compared with one another, and the perpendicular distance to the device whose position varies is calculated for those positions of the object which are determined both by the first sensor and by the second sensor.

The advantage of the invention is that, in addition to reliable determination of the perpendicular distance, it is possible to distinguish reliably between imaginary and real obstructions on the basis of the additional information from the indirect measurement.

In a development, the second sensor transmits a signal which is reflected by the object, and receives this reflected signal (direct measurement), in which case the delay time of this signal is used to determine the possible positions of the object at the same distance from the second sensor.

A real obstruction exists only where all the direct and indirect measurements indicate the position of an object.

In a refinement, all the possible positions of the object with respect to the second sensor are first of all determined in a direct measurement, and the path between the first sensor, the object and the second sensor is then determined in an indirect measurement.

In order to suppress ambiguities, the perpendicular distance between the object and the device whose position varies is determined for that position of the object which was detected both by the indirect measurement by the first sensor and by the direct and indirect measurement by the second sensor.

In order to filter out environmental influences, the distance between the object and the device whose position varies is determined only when the object is located in a sensor corridor which extends between the first sensor and the second sensor.

In a development, when the device whose position varies has a plurality of sensors, the direct and indirect measurement is always carried out by two sensors, and the possible positions of the object determined in this way are compared with one another. The sensor corridor in this case extends between the sensors which are carrying out the present measurement.

Since the sensors are at different distances from one another, sensor corridors of different widths are created when the sensor measurements are carried out in pairs. It is thus possible to locate objects and obstructions in different positions.

If a number of objects at different distances from the device whose position varies are detected, the object at the minimum distance is determined, and the minimum perpendicular distance is calculated and stored.

In a development, the minimum distance to the object is compared with the minimum direct distance to the object detected by an side-edge sensor, and the smaller of these two distances is defined as the minimum distance to the closest object. This also covers the areas beyond the side-edge sensors, which are not covered by the sensor corridors.

In order to detect only obstructions which are actually present, each delay-time measurement is carried out more than once, and a detected object is considered further only if it has been detected in all the measurements. All the sensors must have transmitted a signal once before each first indirect measurement.

BRIEF DESCRIPTION OF THE DRAWINGS

The invention allows numerous exemplary embodiments. One of these is intended to be explained in more detail with reference to the figures which are illustrated in the drawings, and in which.

DETAILED DESCRIPTION OF THE PREFERRED EMBODIMENTS

Figure 1:
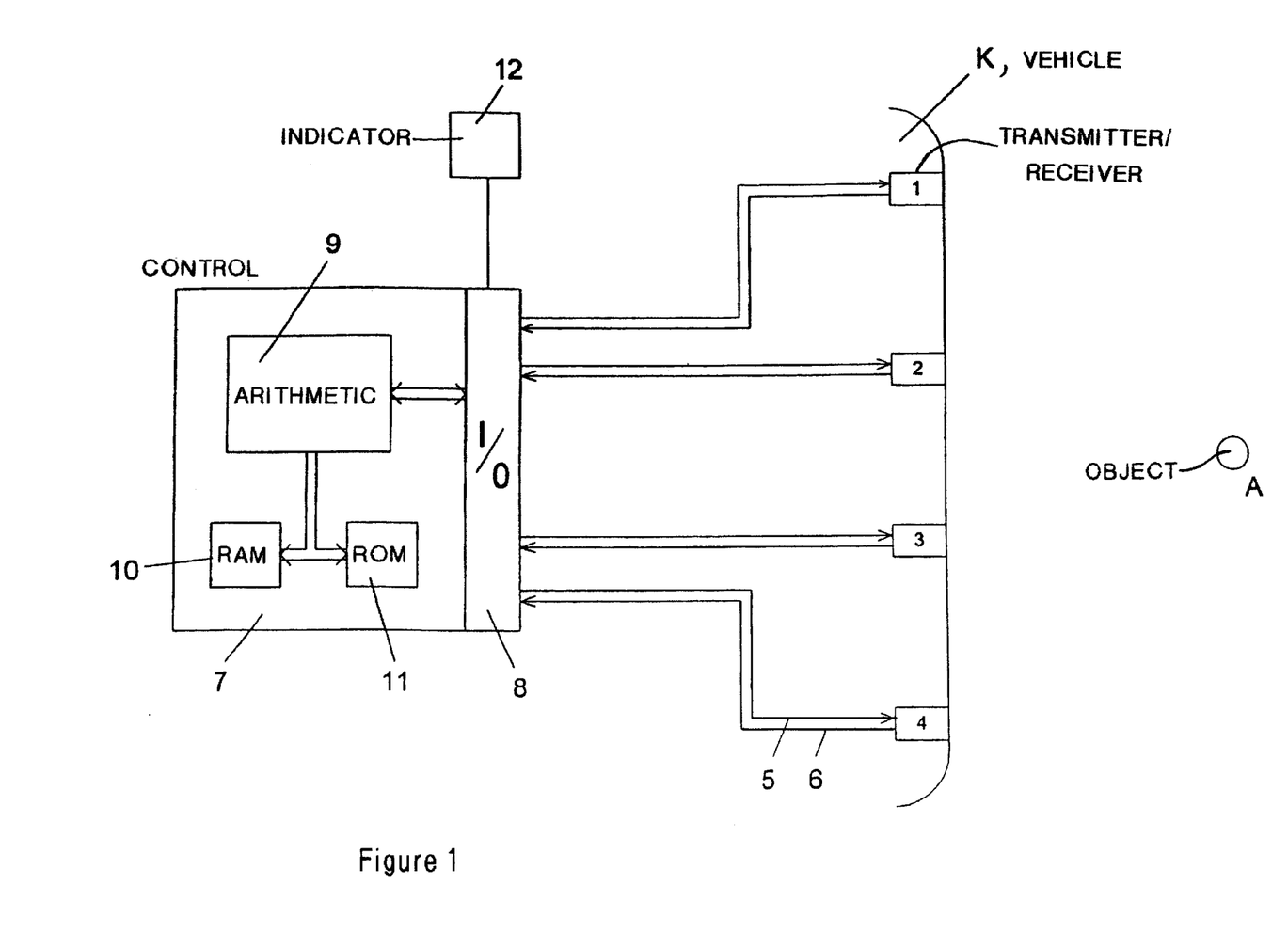
FIG. 1: shows an arrangement for determining the distance between an obstruction and a motor vehicle.

According to FIG. 1, four ultrasound transmitters 1, 2, 3, 4 are arranged at uniform intervals on the rear fender of a motor vehicle K, which are used as reversing and parking aids.

The piezoelectric ultrasound transmitter 1, 2, 3, 4 that are used thus act both as transmitters and receivers. A control unit 7, which is preferably a microprocessor, is connected via transmitting lines 5 and receiving lines 6 to each of the ultrasound transmitters 1, 2, 3, 4. The microprocessor in this case has an input and output unit 8, a central arithmetic unit 9 as well as a random access memory 10 and a read only memory 11.

The microprocessor 7 produces electrical pulses at a frequency of about 40 kHz, which are passed on via the line 5 to the respective ultrasound transmitters 1, 2, 3, 4, where they are converted into corresponding ultrasound pulses. The ultrasound signals reflected by the object A (echoes) are received by the ultrasound receivers 1, 2, 3 and 4, and are passed as an electrical signal via the line 6 to the control unit 7. The control unit 7 uses its internal clock, which is not illustrated in any more detail, to measure the delay time between the transmission of the electrical pulse and the reception of the electrical pulse by the ultrasound transmitter, and stores this delay time in the random access memory 11.

Normally, the delay time t of the ultrasound signal is used to determine the distance s between the motor vehicle (sensor) and the obstruction A using the known equation $$s = \tfrac{1}{2} \times c \times t$$

where c represents the speed of sound.

This direct measurement allows only one statement to be made relating to the distance between the sensor and the object. No new statement can be made relating to the perpendicular distance between the object and the motor vehicle K on which the sensor is located, owing to the ambiguity caused by the possible positions of the object. This is because the number of object positions with the same sensor-object distance is unknown. This sensor-object distance may also be regarded as the radius of a circle, with the circle being the curve on which one or else any number of objects may be located. This semicircle will therefore be referred to as the presence curve DA $1_A$ and DA $1_B$ or DA $2_A$ and DA $2_B$ (see FIG. 3).

The method according to the invention will now be explained with reference to FIGS. 2 and 3, for two sensors.

Before the start of the actual measurement, each ultrasound sensor must have transmitted at least one signal. This is done in an initialization phase 0.

In the actual measurement phase 1, the sensors 1, 2, 3, 4 for direct and indirect measurements are energized and sampled cyclically by the control unit 7. This means that the sensor 1 emits an ultrasound signal, which is reflected on the one hand by the object A and also by the object B. The echoes are received by the sensor 1. On the basis of the different delay times for the signals—from the sensor 1 to the object A and from the sensor 1 to the object B and back again—the control unit 7 calculates a distance to the sensor 1 for each object A and B, and this is stored in the memory 10. All the positions of the object A which are possible with this distance are denoted by the presence curve DA $1_A$. All the possible positions for the object B with respect to the sensor 1 correspond to the presence curve DA $1_B$.

The transmission and reception of the signal by one and the same sensor will be referred to as direct measurement in the following text.

The same direct measurement is carried out with the sensor 2, in which case the sensor 2 not only transmits the signal but also receives the reflected signals. This measurement results, for the object A, in positions with respect to the sensor 2 which lie on the direct presence curve DA $2_A$. The positions of the object B lie on the envelope curve DA $2_B$. These curves are stored in the memory 11 of the controller 7.

Indirect measurements are always carried out at the same time as the direct measurement.

For the sensor 2, which receives only the reflected signal when the signal is transmitted by the sensor 1, the indirect measurement results in presence curves $IA_A$ and $IA_B$, which will be explained in the following text.

Figure 4:
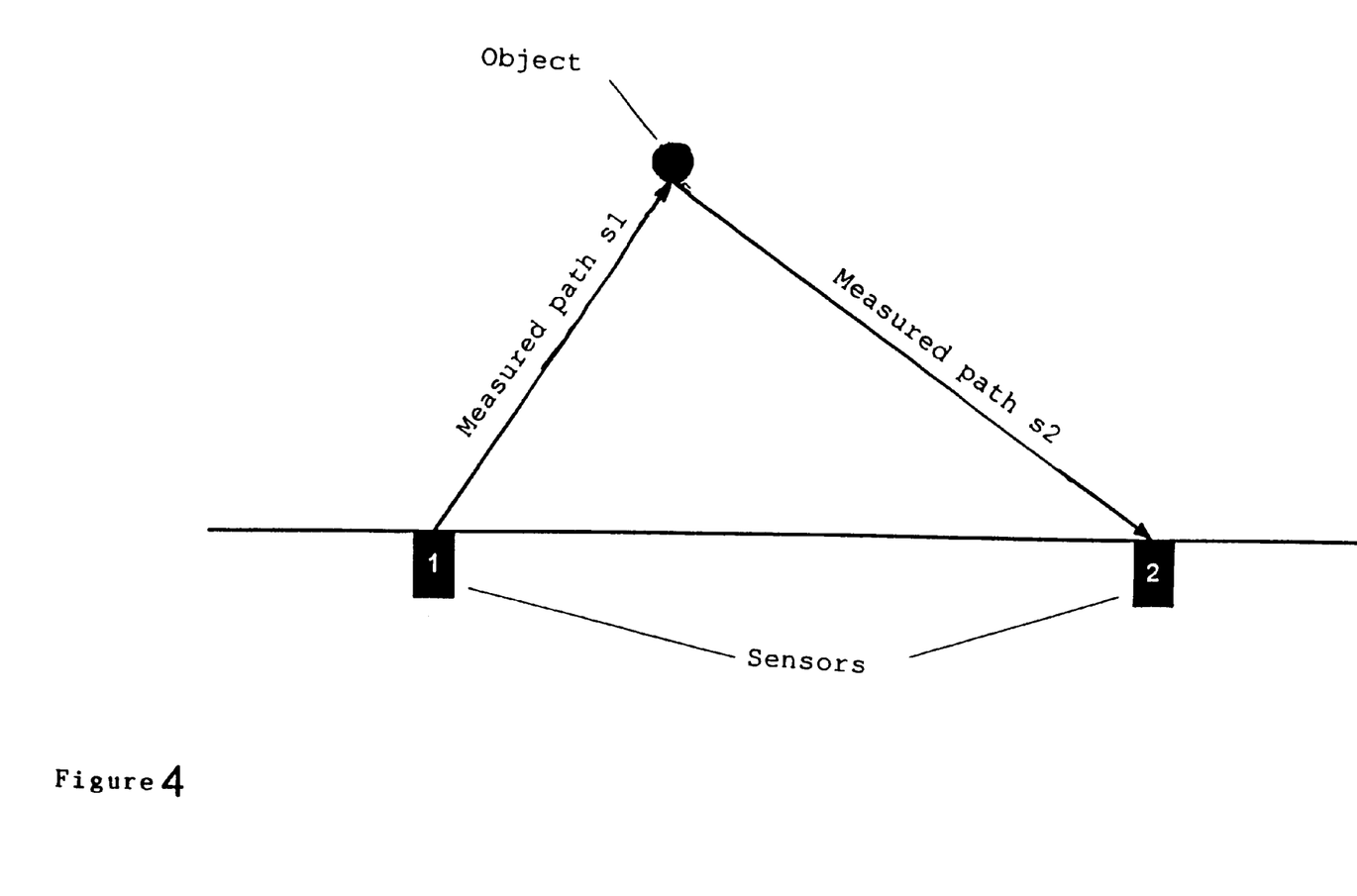
FIG. 4: shows determination of the path for the indirect measurement.

For the indirect measurement, one sensor transmits, while a second sensor receives the ultrasound signal after reflection by an object. The measurement is thus not a distance measurement, but is used to determine the path traveled by the ultrasound signal from the sensor 1 to the object and on to the sensor 2 (FIG. 4). The path is given by the equation $$s = c \times t$$

where c once again represents the speed of sound here, this being 343 m/s at 20° C.

The path traveled by the signal from the sensor 1 to the object A and on from the object A to the sensor 2 is thus determined. If all these positions are plotted, this results in an elliptical presence curve, as is shown as $IA_A$ and $IA_B$ in FIG. 3.

Figure 2:
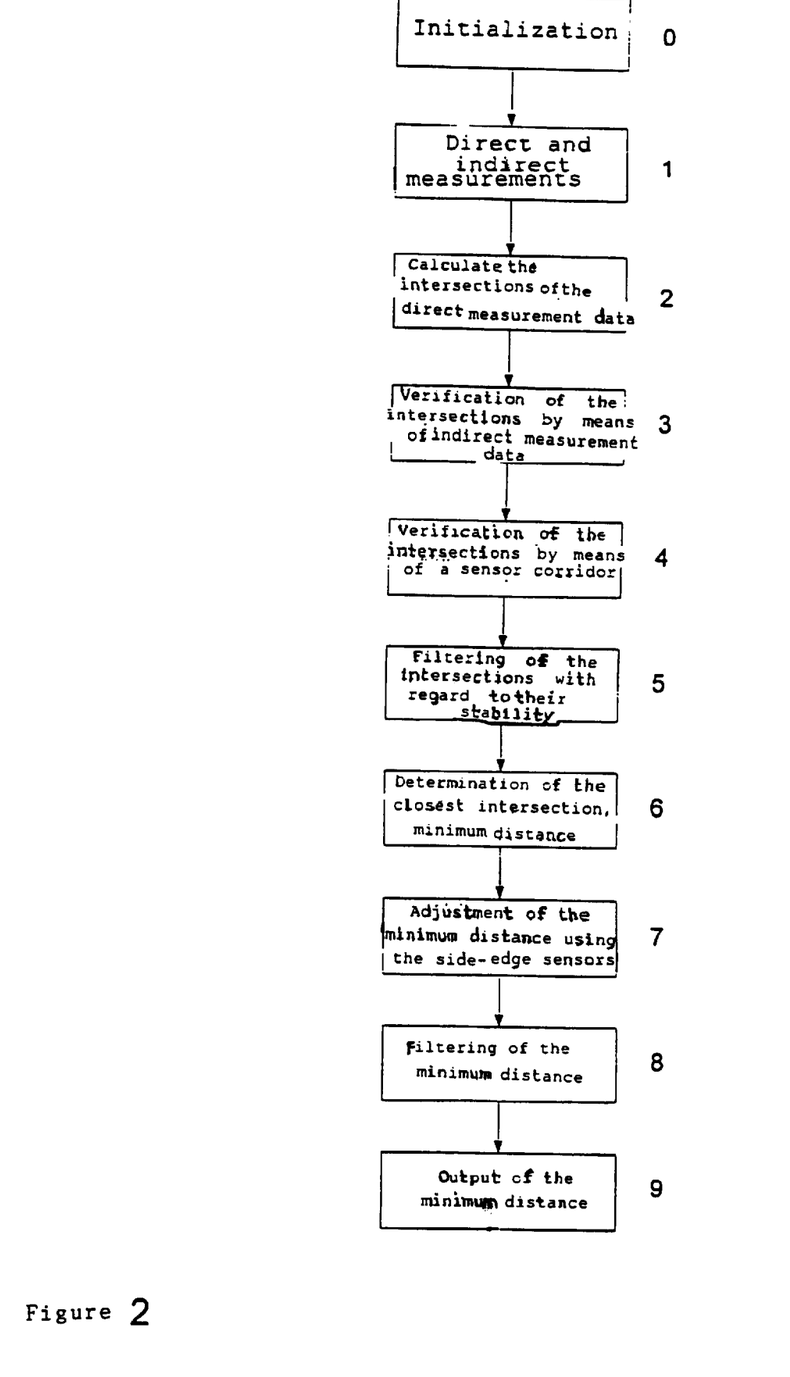
FIG. 2: shows a method relating to the way in which the arrangement according to FIG. 1 operates.
Figure 3:
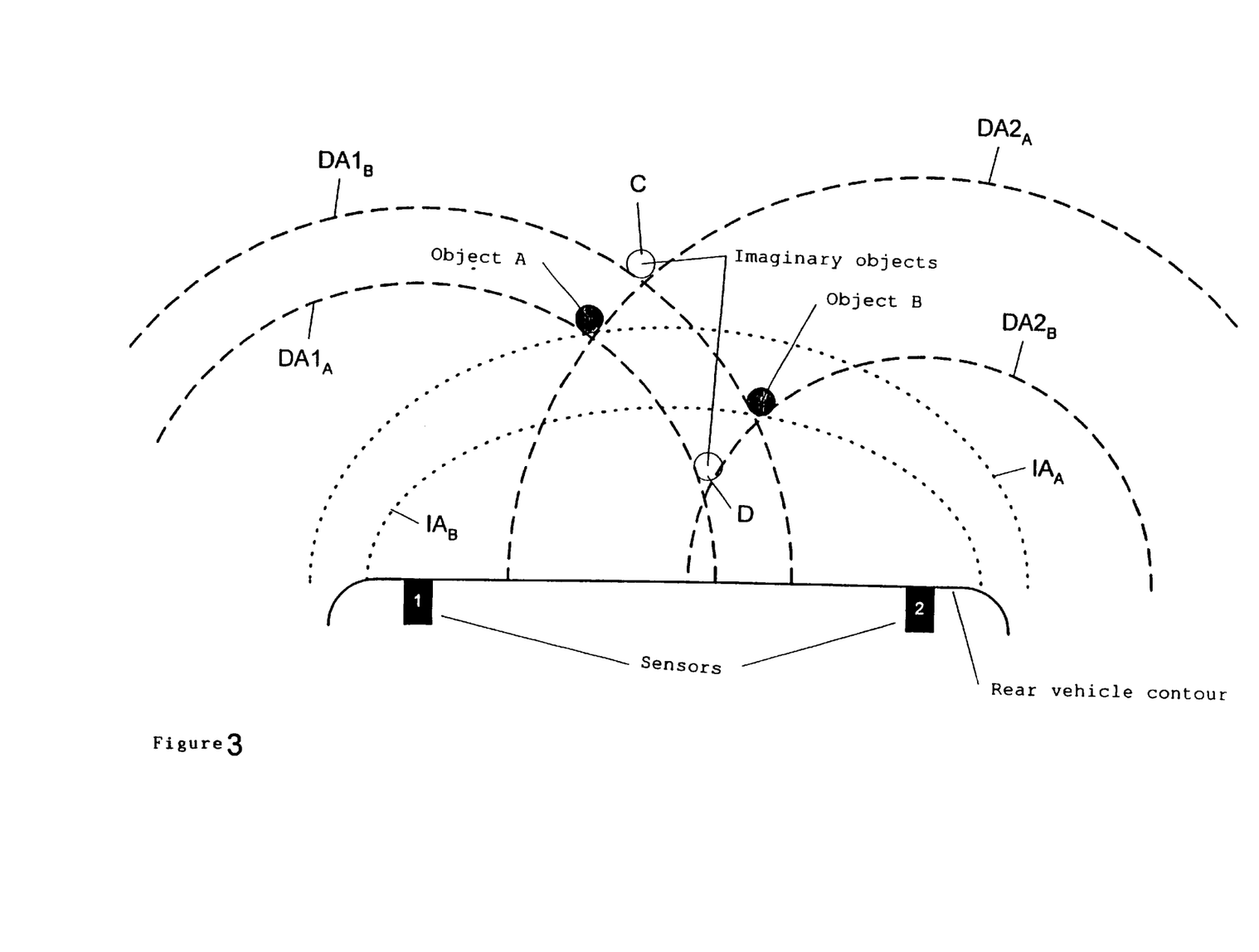
FIG. 3: shows direct and indirect measurement with two sensors.

After step 2 in FIG. 2, the presence curves DA $1_A$ and DA $2_A$ or DA $1_B$ and DA $2_B$, respectively, determined by the direct measurements by the sensors 1 and 2 are compared in order to define common object positions. This is done by determining the intersections of the presence curves. As can be seen from FIG. 3, further imaginary objects D and C are also obtained in this case, however, in addition to the real objects A and B. In step 3, these intersections are verified by the curves $IA_A$ and $IA_B$ which are obtained by the indirect measurement by the sensor 2 or 1 respectively. The presence curve $IA_A$ or $IA_B$, respectively, for the indirect measurement passes through only those intersections of the direct measurements at which real objects are also located.

Figure 5:
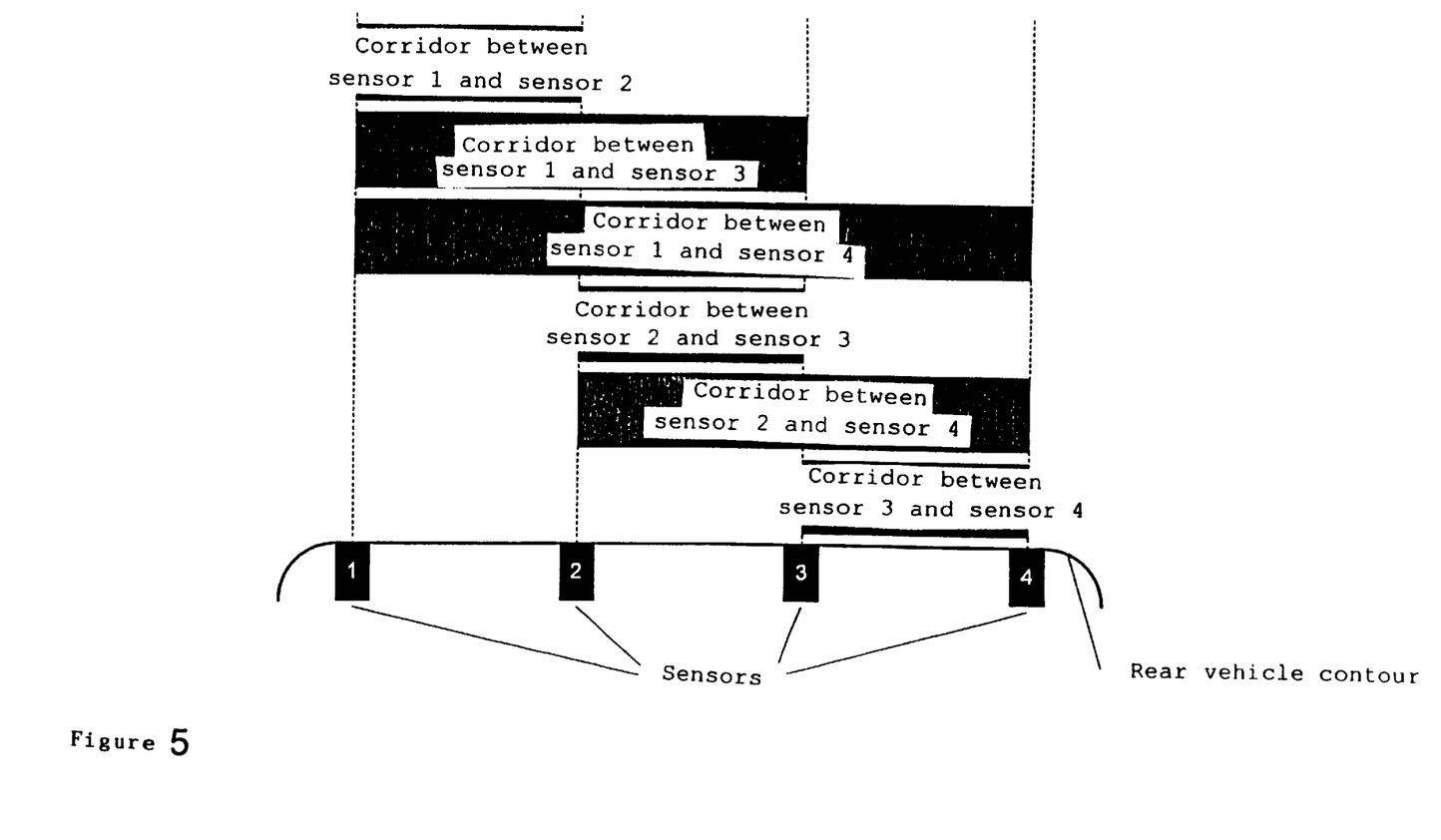
FIG. 5: shows sensor corridors.
Figure 6:
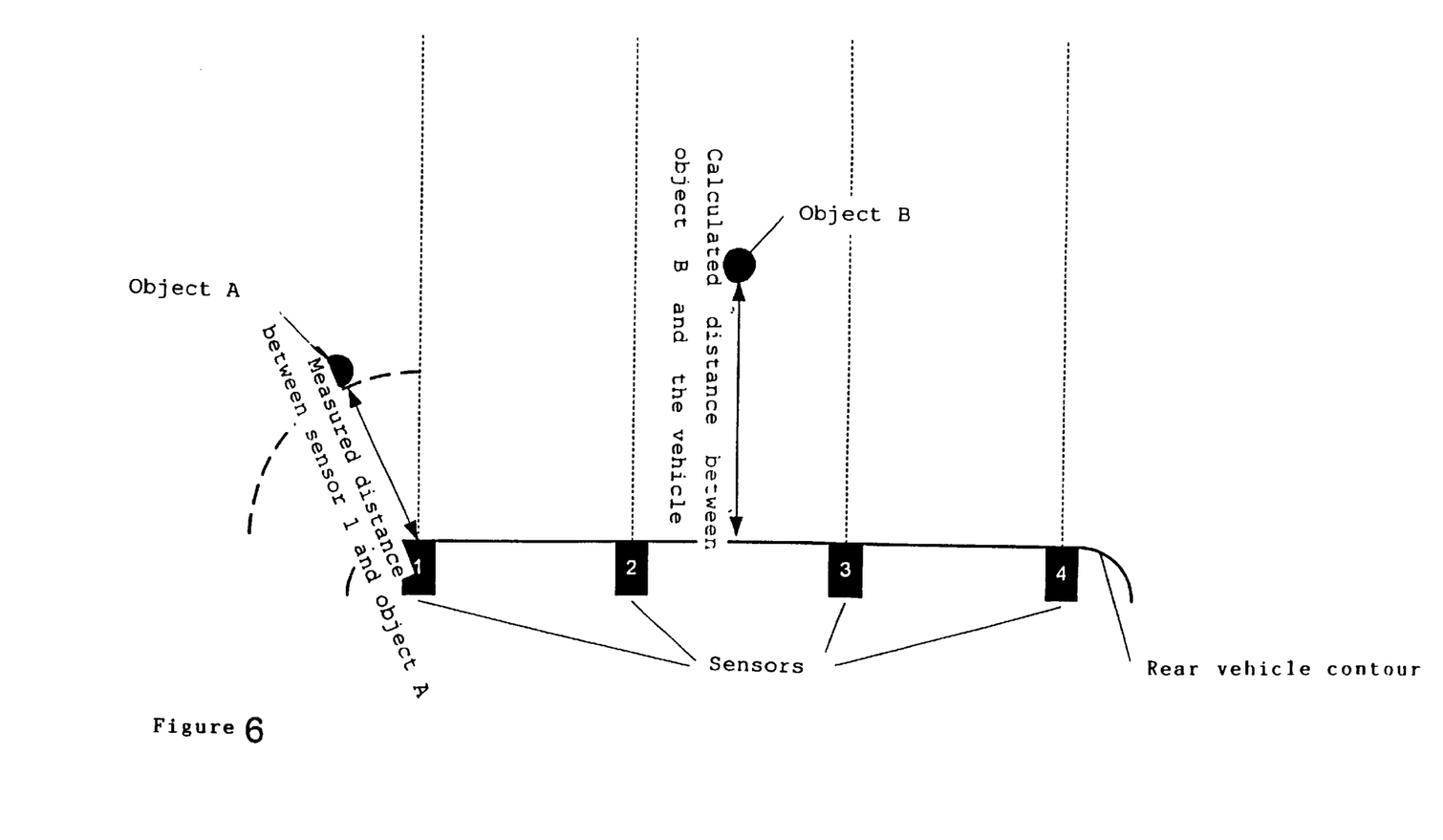
FIG. 6: shows an analysis of the side-edge region of a vehicle.

After step 4, a decision is made as to whether the object A or B found in this way is also located in a sensor corridor between the sensors involved with forming the intersection. This sensor corridor extends at right angles over the full width of the separation between the sensors, in the direction of the obstruction. This is illustrated in FIG. 5, for the four sensors 1, 2, 3, 4 that are used. The measurement method explained in conjunction with FIG. 3 is always carried out for the four sensors 1, 2, 3, 4 such that the described direct and indirect measurements are always carried out in pairs. Since the direct measurement by each sensor is intersected by all the others, this results in six possible sensor combinations:

Sensor 1—Sensor 2
Sensor 1—Sensor 3
Sensor 1—Sensor 4
Sensor 2—Sensor 3
Sensor 2—Sensor 4
Sensor 3—Sensor 4

This in each case takes account of the fact that, for a given sensor pair, the indirect measurements may run from left to right and from right to left. The corridor is always the same, irrespective of this. This therefore also results in six possible corridors, whose width may differ.

The control unit 7 stores all the pulses which are received in a maximum measurement time. This maximum measurement time is given by the maximum distance that can be detected by the transmitter, and is normally 2 m.

The objects determined using the described measurement method are filtered, with regard to their stability, in the step 5 (FIG. 2). Only objects which are also always detected in multiple measurements are processed further. The detected objects are stored in a two-dimensional coordinate system, in which the X-axis runs parallel to the rear vehicle contour, and the Y-axis, at right angles to this, characterizes the distance between the object and the vehicle. In step 6, the object at the shortest distance is found from all the actually detected objects, and the distance is calculated.

Figure 7:
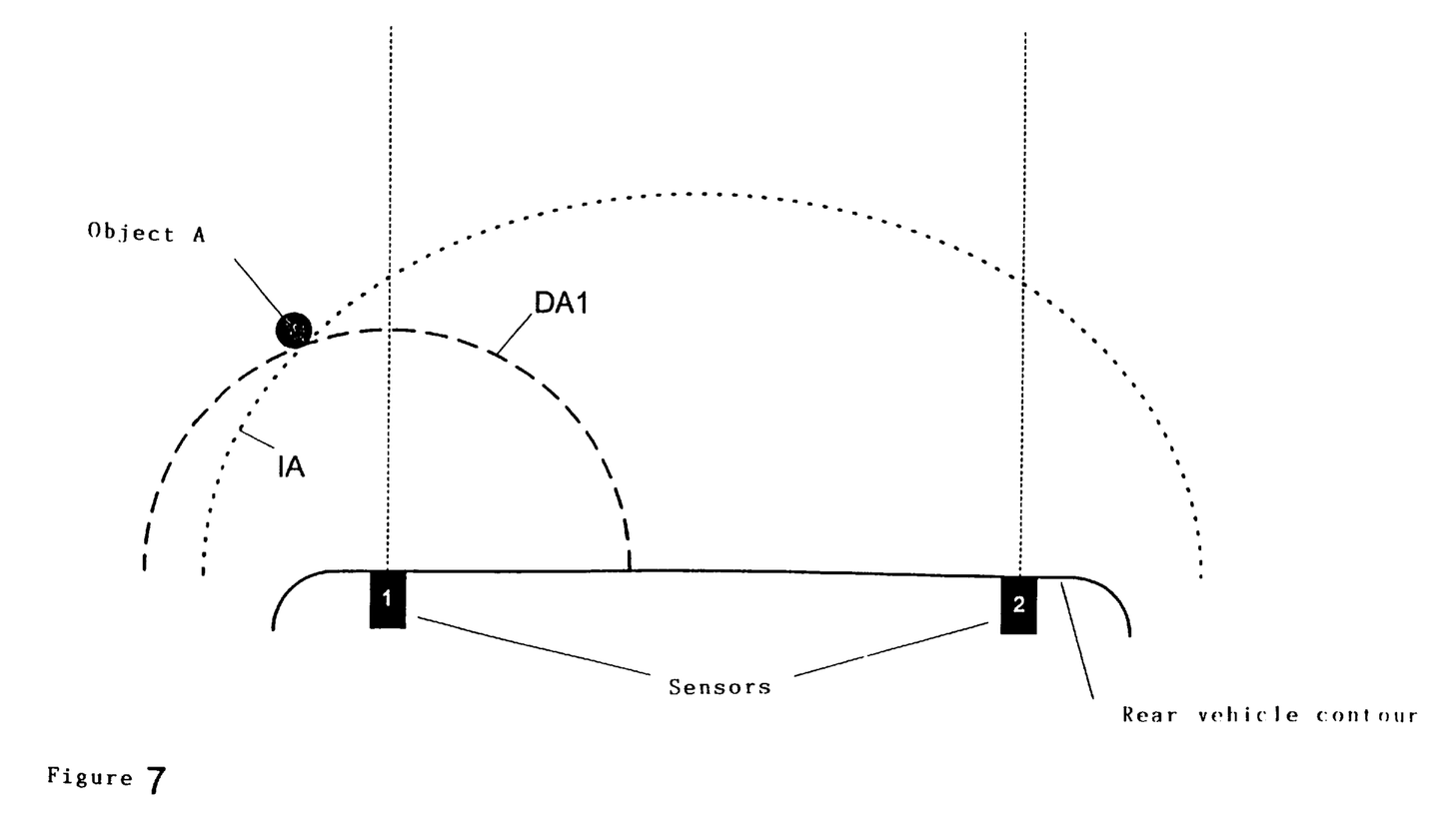
FIG. 7: shows direct and indirect measurement in the side-edge region.

According to step 7, the regions of the sensors 1,4 arranged at the side edge of the vehicle are considered in each case. The regions beyond the edge sensors are not covered, owing to the sensor corridors. If the presence curves for the direct measurement for the edge sensors, for example sensor 1, are considered, it can be seen that they follow the vehicle contour precisely. It follows from this that the outer regions are completely covered by the direct measurements of the side-edge sensors. All that therefore need be done is to compare the direct distance to the object which is closest to the side-edge sensor 1 or 4 with the calculated minimum distance. The smaller of these values is then the appropriate minimum distance. In this case as well, the direct measurement with the aid of the edge sensor 1 or 4 only allows a statement to be made of how far away the object is located. No precise statements relating to the object position is possible unless an indirect measurement IA is carried out by means of the sensor 2 arranged immediately adjacent to the edge sensor 1 (FIG. 7).

The minimum distance is filtered (step 8) by sliding averaging and, in step 9, it is output to the indication device 12 in FIG. 1. This indication apparatus is normally a loud speaker, which emits a horn sound when the motor vehicle is approaching an obstruction.

What is claimed is:

1. A method for determining the perpendicular distance between an object and a device whose position varies, in particular a motor vehicle, in the case of which method a first sensor which is arranged on this device emits a signal which is reflected by the object, and this reflected signal is received by this first sensor, in which case the delay time of the signal from transmission to reception is used by the first sensor to determine the distance between the first sensor and the object, wherein this distance is used to determine all the possible positions of the object with respect to the first sensor, the signal reflected by the object is furthermore received by a second sensor, which is likewise arranged on the device whose position varies, and the delay time of the signal from the first sensor to the second sensor is used to determine a path from the first sensor to the object and from this object to the second sensor, from which path all the possible positions of the object with respect to the second sensor are determined, the positions determined by the first sensor and the second sensor with the same distance are then compared with one another, the method further comprises steps of
    establishing a corridor extending from the device between the first sensor and the second sensor;
    determining whether a position of the object is within the corridor; and
    the perpendicular distance to the device whose position varies is determined for those positions of the object which are in the corridor and are detected by both the first sensor and the second sensor.

2. The method as claimed in claim 1, wherein the second sensor transmits a signal and receives the signal reflected by the object, from which signal the possible positions of the object with respect to the second sensor are determined.

3. The method as claimed in claim 2, wherein a transmitter transmits a signal, and all the transmitters present receive the signal reflected by the object.

4. The method as claimed in claim 1, wherein the perpendicular distance between the object and the device whose position varies is determined for all those positions of the object which are detected both with the direct measurement of the first sensor and with the direct and indirect measurement of the second sensor, and/or vice versa.

5. The method as claimed in claim 1, wherein the distance between the object and the device whose position varies is determined only when the object is located in the corridor.

6. The method as claimed in claim 1, wherein, when a plurality of sensors are present on the device whose position varies, the direct and indirect measurements are always carried out by two sensors, and the determined positions are compared with one another.

7. The method as claimed in claim 5, wherein there are a plurality of sensors including the first sensor and the second sensor, and the sensor corridor extends between the sensors which are carrying out the present measurements.

8. The method as claimed in claim 6, wherein, if a plurality of objects are detected at different distances from the device whose position varies, the object at the minimum distance is detected.

9. The method as claimed in claim 7, wherein the minimum distance to the object is compared with the minimum direct distance to the object detected by a side-edge sensor, and the smaller of these two distances is defined as the minimum distance to the closest object.

10. The method as claimed in claim 1, wherein each delay-time measurement is carried out more than once, and a detected object is considered further only if it has been detected in all the measurements.

11. The method as claimed in one of claims 6 to 10, wherein all the sensors have transmitted a signal at least once before the first determination of the indirect presence positions.

12. A method for determining the perpendicular distance between an object and a device whose position varies, in particular a motor vehicle, to enable a distinguishing between imaginary and real obstructions by use of direct and indirect measurements; wherein, according to the method:
    a first sensor on this device emits a signal which is reflected by the object, giving a reflected signal to be received by this first sensor;
    employing the delay time of the signal from transmission to reception by the first sensor to determine the distance between the first sensor and the object;
    employing this distance to determine all possible positions of the object with respect to the first sensor, the signal reflected by the object being received also by a second sensor on the device;
    employing the delay time of the signal from the first sensor to the second sensor to determine a path from the first sensor to the object and from this object to the second sensor, this path enabling determination of all possible positions of the object with respect to the second sensor;
    comparing the positions determined by the first sensor and the second sensor which have the same distance;
    establishing a corridor extending from the device between the first sensor and the second sensor;
    determining whether a position of the object is within the corridor; and
    determining the perpendicular distance to the device for those positions of the object which are in the corridor and are detected by both the first sensor and the second sensor, wherein the measurements by the first sensor are direct measurements, and the measurements by the second sensor are indirect measurements for distinguishing between real and imaginary obstructions.

* * * * *